US012574405B2

(12) United States Patent
Xiong

(10) Patent No.: US 12,574,405 B2
(45) Date of Patent: Mar. 10, 2026

(54) METHOD AND APPARATUS FOR SOLVING DENIAL-OF-SERVICE ATTACK, DEVICE, MEDIUM, AND COMPUTER PROGRAM PRODUCT

(71) Applicant: TENCENT TECHNOLOGY (SHENZHEN) COMPANY LIMITED, Shenzhen (CN)

(72) Inventor: Chunshan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 386 days.

(21) Appl. No.: 17/989,494

(22) Filed: Nov. 17, 2022

(65) Prior Publication Data
US 2023/0088071 A1 Mar. 23, 2023

Related U.S. Application Data

(63) Continuation of application No. PCT/CN2022/078319, filed on Feb. 28, 2022.

(30) Foreign Application Priority Data

Apr. 2, 2021 (CN) .......................... 202110363831.5

(51) Int. Cl.
*H04L 9/40* (2022.01)

(52) U.S. Cl.
CPC ...... *H04L 63/1458* (2013.01); *H04L 63/1425* (2013.01)

(58) Field of Classification Search
CPC ........... H04L 63/1425; H04L 63/1458; H04W 12/12
See application file for complete search history.

(56) References Cited

U.S. PATENT DOCUMENTS

| | | | | |
|---|---|---|---|---|
| 10,277,626 | B2 * | 4/2019 | Chien | ................. H04L 63/0876 |
| 11,496,573 | B2 | 11/2022 | Dao et al. | |
| 11,570,828 | B2 * | 1/2023 | Jimenez Cordon | .......................... H04L 12/1407 |

(Continued)

FOREIGN PATENT DOCUMENTS

| | | |
|---|---|---|
| CN | 106534048 A | 3/2017 |
| CN | 111165013 A | 5/2020 |

(Continued)

OTHER PUBLICATIONS

3GPP TS 29.244 V17.0.0, 3rd Generation Partnership Project; Technical Specification Group Core Network and Terminals; Interface between the Control Plane and the User Plane Nodes; Stage 3; pp. 1-150 (Mar. 2021) (Year: 2021).*

(Continued)

*Primary Examiner* — Sharon S Lynch
(74) *Attorney, Agent, or Firm* — Anova Law Group, PLLC

(57) ABSTRACT

A method includes: transmitting, by a session management function (SMF), a packet detection rule (PDR) and a quality of service (QoS) enforcement rule (QER) to a user plane function (UPF), the PDR being used for identifying a target packet transmitted by a terminal, and the QER being used for limiting transmission of the target packet, where the target packet is a packet that triggers a target core network element to initiate the DoS attack to the SMF.

20 Claims, 7 Drawing Sheets

```
┌──────────────┐                    ┌──────────────┐
│     SMF      │                    │     UPF      │
└──────────────┘                    └──────────────┘
        │                                   │
        │  120. Transmit a PDR and a QER to a UPF
        │───────────────────────────────────▶
        │                                   │
             ┌───────────────────────────────────────┐
             │ 140. Receive the PDR and the QER transmitted │
             │              by the SMF               │
             └───────────────────────────────────────┘
                                 │
             ┌───────────────────────────────────────┐
             │ 160. Identify a target packet transmitted by a │
             │      terminal according to the PDR     │
             └───────────────────────────────────────┘
                                 │
             ┌───────────────────────────────────────┐
             │ 180. Limit transmission of the target packet │
             │          according to the QER          │
             └───────────────────────────────────────┘
```

(56) References Cited

U.S. PATENT DOCUMENTS

| | | | | |
|---|---|---|---|---|
| 11,582,589 | B2 * | 2/2023 | Taft | H04L 63/14 |
| 11,601,447 | B1 * | 3/2023 | Nelson | H04W 12/128 |
| 11,689,502 | B2 * | 6/2023 | Burakovsky | H04L 63/1466 726/1 |
| 12,238,007 | B2 * | 2/2025 | Puente Pestaña | H04L 45/0377 |
| 12,255,874 | B2 * | 3/2025 | Burakovsky | H04L 63/1466 |
| 2018/0131718 | A1 * | 5/2018 | Chien | H04L 63/0876 |
| 2020/0053564 | A1 | 2/2020 | Thakolsri et al. | |
| 2020/0059992 | A1 | 2/2020 | Skog et al. | |
| 2020/0259853 | A1 | 8/2020 | Alfano et al. | |
| 2020/0351984 | A1 | 11/2020 | Talebi et al. | |
| 2021/0289566 | A1 * | 9/2021 | Jimenez Cordon | H04L 12/1407 |
| 2021/0392477 | A1 * | 12/2021 | Taft | H04W 12/37 |
| 2021/0409375 | A1 * | 12/2021 | Burakovsky | H04W 12/088 |
| 2022/0030117 | A1 * | 1/2022 | Young | H04M 15/8016 |
| 2022/0247688 | A1 * | 8/2022 | Puente Pestaña | H04L 45/64 |
| 2022/0256396 | A1 * | 8/2022 | Hu | H04W 76/32 |
| 2022/0385550 | A1 * | 12/2022 | Villasante | H04L 43/026 |
| 2023/0179967 | A1 * | 6/2023 | Taft | H04L 63/1408 726/1 |
| 2023/0412566 | A1 * | 12/2023 | Burakovsky | H04L 63/10 |

FOREIGN PATENT DOCUMENTS

| | | | |
|---|---|---|---|
| CN | 111431882 | A | 7/2020 |
| CN | 111526132 | A | 8/2020 |
| CN | 111556539 | A | 8/2020 |
| CN | 112105053 | A | 12/2020 |
| CN | 112314032 | A | 2/2021 |
| CN | 112437456 | A | 3/2021 |
| CN | 113114649 | A | 7/2021 |
| EP | 3306887 | A1 | 4/2018 |
| WO | 2018214638 | A1 | 11/2018 |
| WO | 2019141169 | A1 | 7/2019 |
| WO | 2021001051 | A1 | 1/2021 |

OTHER PUBLICATIONS

The World Intellectual Property Organization (WIPO) International Search Report for PCT/CN2022/078319 Apr. 28, 2022 8 Pages (including translation).

Huawei. "Aligning "MO Exception data" handling with stage 2—UPF", Jun. 2, 2020, 3GPP TSG-CT WG4 Meeting #98e.

China National Intellectual Property Administration (CNIPA) Office Action 1 for 20210363831.5 Aug. 1, 2023 11 Pages (including translation).

* cited by examiner

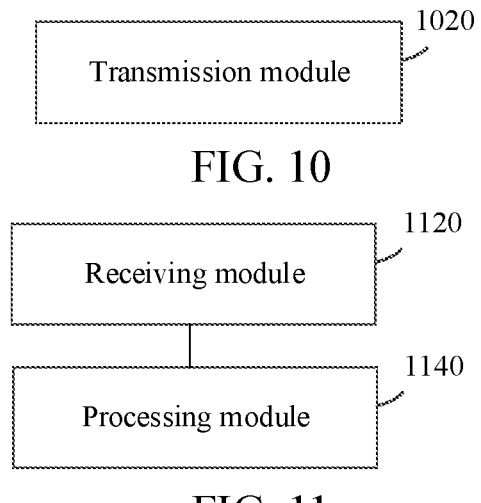
FIG. 10
FIG. 11
Network element device 1200
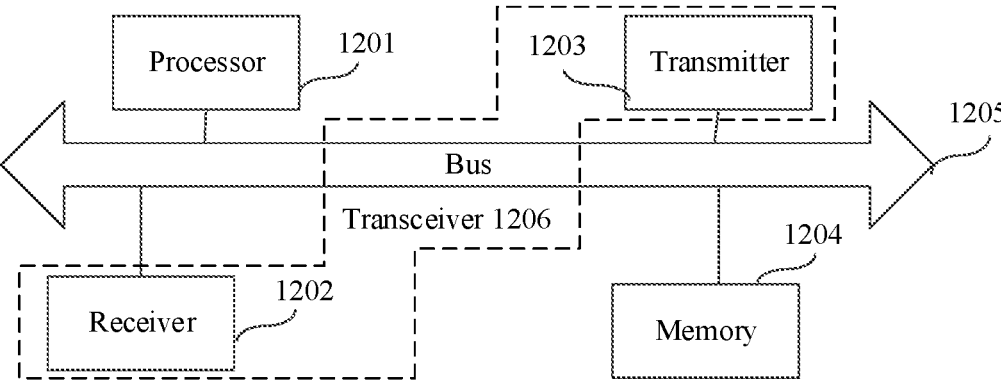
FIG. 12

METHOD AND APPARATUS FOR SOLVING DENIAL-OF-SERVICE ATTACK, DEVICE, MEDIUM, AND COMPUTER PROGRAM PRODUCT

RELATED APPLICATION(S)

This application is a continuation application of PCT Patent Application No. PCT/CN2022/078319 filed on Feb. 28, 2022, which claims priority to Chinese Patent Application No. 2021103638315, entitled "METHOD AND APPARATUS FOR SOLVING DENIAL-OF-SERVICE ATTACK, DEVICE, MEDIUM, AND COMPUTER PROGRAM PRODUCT" filed on Apr. 2, 2021, all of which are incorporated by reference entirety.

FIELD OF THE TECHNOLOGY

The present disclosure relates to the field of mobile communication, and in particular, to a method and an apparatus for solving a denial-of-service (DoS) attack, a device, a medium, and a computer program product.

BACKGROUND

In an edge computing scenario, a domain name system (DNS) query transmitted by user equipment (UE) may be processed through an edge application server discovery function (EASDF).

A session management function (SMF) provides a reporting rule and a forwarding rule to the EASDF. The reporting rule provides a rule for the EASDF to transmit a report to the SMF, and the forwarding rule provides a rule for the EASDF to forward a message. After the UE transmits the DNS query to the EASDF, the EASDF transmits a report to the SMF according to the reporting rule.

When an uplink peak rate is relatively high, and when the UE transmits DNS queries to the EASDF in a short time in a malicious manner, and the EASDF transmits reports to the SMF and triggers a plurality of subsequent signaling messages on a control plane, a signaling storm of a mobile communication system is formed, resulting in a denial-of-service (DoS) attack, where the mobile communication system cannot serve all normal UE.

SUMMARY

According to various embodiments of the present disclosure, a method and an apparatus for solving a denial-of-service (DoS) attack, a device, a medium, and a computer program product are provided. The technical solutions are as follows.

In one aspect, the present disclosure provides a method for solving a DoS attack. The method includes: transmitting, by an SMF, a packet detection rule (PDR) and a quality of service (QoS) enforcement rule (QER) to a user plane function (UPF), the PDR being used for identifying a target packet transmitted by a terminal, and the QER being used for limiting transmission of the target packet, where the target packet is a packet that triggers a target core network element to transmit a message to the SMF.

In another aspect, the present disclosure provides a method for solving a DoS attack. The method includes: receiving, by a UPF, a PDR and a QER transmitted by an SMF; identifying, by the UPF, a target packet transmitted by a terminal according to the PDR; and limiting, by the UPF, transmission of the target packet according to the QER, the target packet being a packet that triggers a target core network element to initiate the DoS attack to the SMF.

In yet another aspect, the present disclosure provides an apparatus for solving a DoS attack. The apparatus includes: a memory storing computer program instructions; and a processor coupled to the memory and configured to execute the computer program instructions and perform: transmitting, by an SMF, a packet detection rule (PDR) and a quality of service (QoS) enforcement rule (QER) to a user plane function (UPF), the PDR being used for identifying a target packet transmitted by a terminal, and the QER being used for limiting transmission of the target packet, where the target packet is a packet that triggers a target core network element to transmit a message to the SMF.

In yet another aspect, the present disclosure provides an apparatus for solving a DoS attack. The apparatus includes: a memory storing computer program instructions; and a processor coupled to the memory and configured to execute the computer program instructions and perform: receiving, by a UPF, a PDR and a QER transmitted by an SMF; identifying, by the UPF, a target packet transmitted by a terminal according to the PDR; and limiting, by the UPF, transmission of the target packet according to the QER, the target packet being a packet that triggers a target core network element to initiate the DoS attack to the SMF.

In yet another aspect, the present disclosure provides a computer-readable storage medium, storing a computer program, the computer program being loaded and executed by a processor to implement the method for solving a DoS attack.

Details of one or more embodiments of the present disclosure are provided in the accompanying drawings and descriptions below. Other features and advantages of the present disclosure become clearer from the present disclosure, the accompanying drawings, and the claims.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

FIG. 10 is a schematic block diagram of an apparatus for solving a DoS attack according to certain embodiment(s) of the present disclosure;

FIG. 11 is a schematic block diagram of an apparatus for solving a DoS attack according to certain embodiment(s) of the present disclosure; and FIG. 12 is a schematic structural diagram of a network element device according to certain embodiment(s) of the present disclosure.

DETAILED DESCRIPTION

Figures 1, 2:
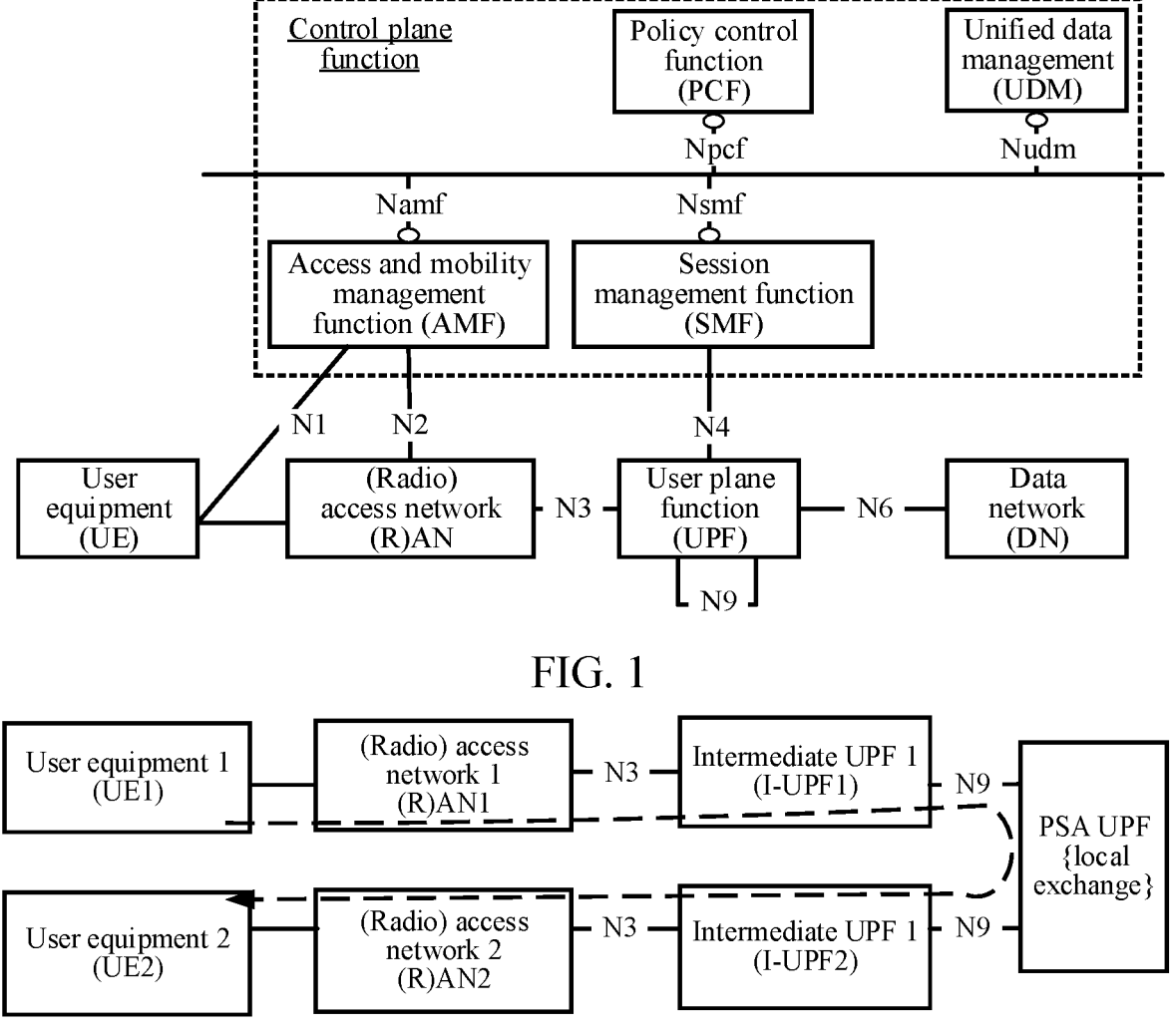
FIG. 1 is a schematic block diagram of a mobile communication system according to certain embodiment(s) of the present disclosure.
FIG. 2 is a schematic diagram of N3/N9-based communication according to certain embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

"Plurality of" refers to two or more. The "and/or" describes an association relationship for describing associated objects and represents that three relationships may exist. For example, A and/or B may represent the following three scenarios: Only A exists, both A and B exist, and only B exists. The character "/" generally indicates an "or" relationship between the associated objects.

In an edge computing scenario, user equipment (UE) transmits a protocol data unit (PDU) session establishment request to a session management function (SMF). The SMF locates and selects an edge application server discovery function (EASDF) for the UE. The SMF transmits a message to the selected EASDF, and the message carries: an IP address of the UE, a callback uniform resource identifier (URI), and a rule for processing a domain name system (DNS) message. A callback address is a target resource URI requested by the EASDF when the EASDF initiates a message to the SMF.

In certain embodiment(s), the SMF provides a reporting rule to the EASDF, and a report from the EASDF to the SMF is transmitted through at least two types of reporting rules:

1. A Report Triggered Based on a DNS Query.

If a fully qualified domain name(s) (FQDN) of an edge application server (EAS) in the DNS query matches an FQDN (s) filter in the reporting rule, the SMF may provide the reporting rule to instruct the EASDF to transmit the EAS FQDN(s) to the SMF. The SMF provides a forwarding rule to the EASDF. The EASDF forwards the DNS query to a local DNS or to a C-DNS after an ECS attribute is added.

2. A Report Triggered Based on a DNS Response.

The SMF provides the reporting rule to guide the EASDF to report an EAS IP address/FQDN to the SMF if an EAS IP address in the DNS response matches an IP address range of the reporting rule, or an FQDN of the DNS response matches an FQDN of a DNS message reporting rule. The SMF may insert a UL CL, which introduces more signaling interactions. In particular, UE, RAN, AMF, I-UPF, and L-PSA all participate in the signaling interaction.

Because the SMF configures the reporting rule to the EASDF, if the UE transmits a DNS query to the EASDF, it may cause the EASDF to transmit a report (or report message) to the SMF. This report triggers more subsequent signaling and messages. For example, an uplink peak rate of 5G may reach 300 Mbps. That is, a piece of UE can upload 300 Mb of data in one second, that is, 300 M/8/1500=25000 DNS queries per second per UE. 8 is a quantity of bits in a byte, and it is assumed that a DNS query is 1500 bytes long.

A DNS query may trigger a signaling interaction with the SMF, and may trigger signaling of an uplink classifier (UL CL) insertion operation of the SMF. Therefore, a signaling storm of a mobile communication system is formed, resulting in a DoS attack, and the mobile communication system cannot serve all normal UE (because signaling of 5G system is easily occupied by DoS, the mobile communication system may only serve some normal UE or cannot serve normal UE at all).

In addition, a plurality of pieces of UE may simultaneously transmit DNS queries to the EASDF through cooperation of different cells. This may cause a DDoS attack, resulting in a more serious attack, and resulting when or in response to a determination that the mobile communication system can hardly serve the normal UE.

In addition, because the SMF can also realize a function of a dynamic host configuration protocol (DHCP) service, the DHCP service is used for assigning an IP address to the UE or assigning an IP related parameter to the UE. The UE can transmit a large number of DHCP request packets to the SMF through an N4 interface by using a high rate of a user plane, to generate a large number of signaling of the N4 interface between the UPF and the SMF, and request the SMF to process through the large number of DHCP request packets, which can occupy time and resources of processing the DHCP by the SMF, thus realizing the DoS attack. Similarly, the DDoS attack may be realized when a plurality of pieces of UE transmit the large number of DHCP request packets to a UPF and SMF through cooperation at the same time. The present disclosure provides a solution to the DoS attack to solve the technical problems.

FIG. 1 is a block diagram of a mobile communication system according to an exemplary embodiment of the present disclosure. The mobile communication system may be a 5G system based on NR, and includes a 5G system based on an evolved UMTS terrestrial radio access network (e-UTRAN) and a subsequent evolution system of the 5G system. The communication system is defined to support a data connection and service, so that technologies such as a network functions virtualization (NFV) and a software defined network (SDN) can be used during network deployment. The communication system is formed by a network function (NF), and uses distributed functions to deploy. Addition and withdrawal of a new network function do not affect a function of a whole network. The communication system includes: user equipment (UE) (named by 3GPP for a mobile terminal), (radio) access network ((R)AN), user plane function (UPF), data network (DN), and control plane function.

The control plane function includes: access and mobility management function (AMF), session management function (SMF), policy control function (PCF), and unified data management (UDM).

The UE communicates with the RAN through an air interface. The RAN communicates with the UPF through a first reference point N3. Two UPFs communicate with each other through a second reference point N9. The PSA UPF communicates with the DN through a third reference point N6.

There may be a plurality of pieces of UE, RANs, UPFs, and DNs. When there are the plurality of UPFs, there are some UPFs that are PDU session anchor user plane functions (PSA UPFs) of the UE. Two PSA UPFs communicate with each other through a fourth reference point N19 (not shown in FIG. 1).

The UE communicates with the AMF through a fifth reference point N1. The RAN communicates with the AMF through a sixth reference point N2. The UPF communicates with the SMF through a seventh reference point N4.

In a network architecture shown in FIG. 1, the following reference points are included:

N1: a reference point between the UE and the AMF;
N2: a reference point between the (R)AN and the AMF;
N3: a reference point between the (R)AN and the UPF;
N4: a reference point between the SMF and the UPF;
N6: a reference point between the PSA UPF and the data network;
N9: a reference point between two UPFs;
N14: a reference point between two AMFs;
N19: a reference point between two PSA UPFs of a 5G LAN-type service (not shown in the figure).

In the network architecture shown in FIG. 1, the following service-based interfaces are included:

Namf: a service-based interface shown by the AMF;
Nsmf: a service-based interface shown by the SMF;
Npcf: a service-based interface shown by the PCF;
Nudm: a service-based interface shown by the UDM.

In different implementation scenarios, connection methods between the UE, and between the UE and the UPF may include the following scenarios:

First, a connection method of local switching (based on the first reference point N3 or the second reference point N9).

Two pieces of UE are connected to the same PSA UPF, and data between the two pieces of UE is directly exchanged inside the PSA UPF. It is unnecessary for the data to be transmitted outside the third reference point N6, and to be returned by an external router or switch.

With reference to FIG. 2, UE1 communicates with a RAN1, and the RAN1 communicates with an intermediate UPF1. UE2 communicates with a RAN2, and the RAN2 communicates with an intermediate UPF2. Both the UE1 and the UE2 are connected to the same PSA UPF. When the UE1 transmits a packet, the packet is directly exchanged inside the PSA UPF, so that the packet is transmitted to the UE2 without transmitting the packet outside the third reference point N6.

Second, a method based on the third reference point N6.

When a piece of UE communicates with a device on the DN, broadcast data between the UE and the device may be exchanged through the N6.

Figures 3, 4:
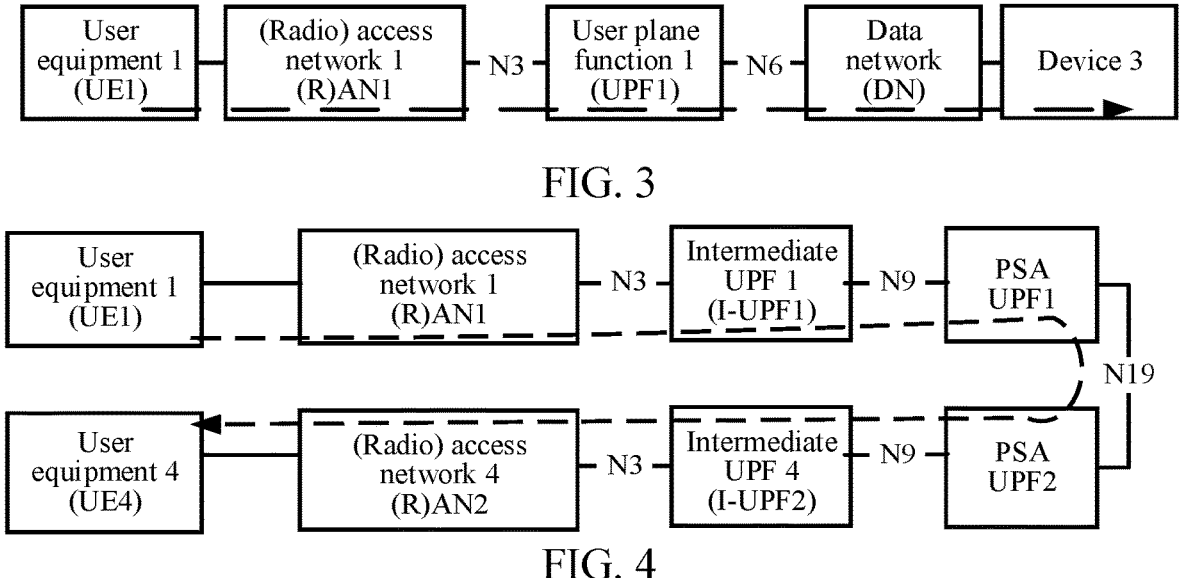
FIG. 3 is a schematic diagram of N6-based communication according to certain embodiment(s) of the present disclosure.
FIG. 4 is a schematic diagram of N19-based communication according to certain embodiment(s) of the present disclosure.

With reference to FIG. 3, the UE1 communicates with the RAN1, the RAN1 communicates with the UPF1, and a PSA UPF1 communicates with the DN. When the UE1 transmits a packet, the packet may be transmitted to a device 3 on the DN through the N6.

Third, a method based on the fourth reference point N19.

When two pieces of UE are connected to different PSA UPFs, data between the two pieces of UE may be exchanged through the fourth reference point N19, and an N19 tunnel is established between two PSA UPFs.

With reference to FIG. 4, the UE1 communicates with the RAN1, and the RAN1 communicates with the intermediate UPF1. UE4 communicates with the RAN2, and the RAN2 communicates with the intermediate UPF2. The UE1 and the UE4 are respectively connected to different PSA UPFs: a PSA UPF1 and a PSA UPF2. The N19 tunnel is established between the two PSA UPFs. When the UE1 transmits the packet, the packet may be exchanged through the N19 tunnel between the two PSA UPFs, and to be transmitted to the UE4.

Figure 5:
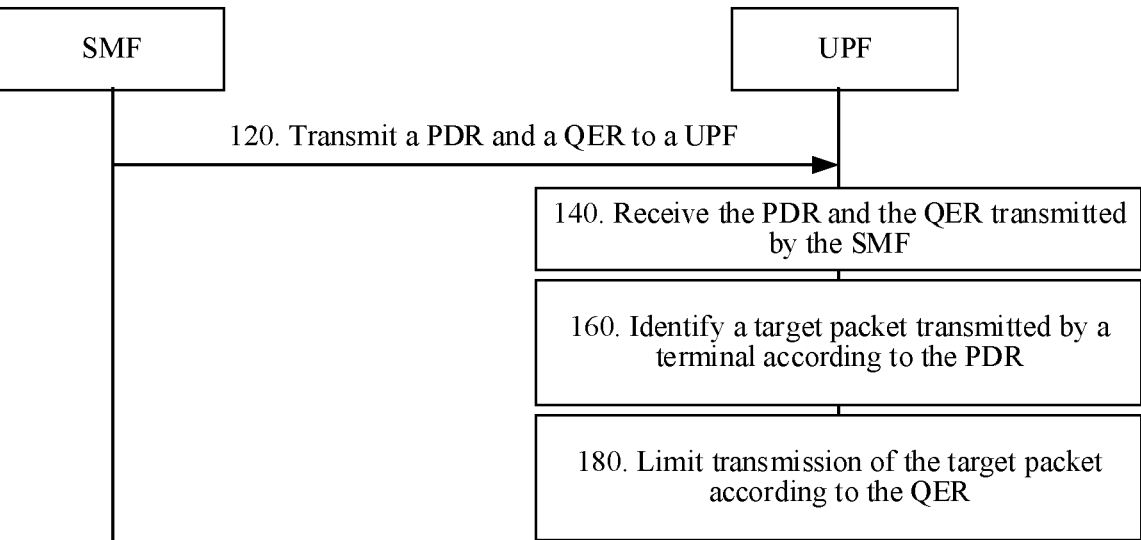
FIG. 5 is a schematic flowchart of a method for solving a denial-of-service (DoS) attack according to certain embodiment(s) of the present disclosure.

FIG. 5 is a flowchart of a method for solving a DoS attack according to an exemplary embodiment of the present disclosure. This embodiment is described through an example in which the method is performed by the SMF and the UPF. The method includes:

Step 120: Transmit, by an SMF, a PDR and a QER to a UPF.

The PDR is used for identifying a target packet transmitted by a terminal, and the QER is used for limiting transmission of the target packet by the terminal.

The target packet is a packet that triggers a target core network element to initiate the DoS attack to the SMF. The target packet includes, but is not limited to, at least one of the following two packets: a DNS query packet, the DNS query packet being a packet that triggers an EASDF to transmit a report to the SMF; and a DHCP request packet, the DHCP request packet being a packet that triggers the UPF to forward a message to the SMF.

In certain embodiment(s), the SMF transmits the PDR and the QER to the UPF when or in response to a determination that a DoS attack is identified. For example, the SMF transmits the PDR and the QER to the UPF when or in response to a determination that a reporting rate of the EASDF reaches a limit threshold. Alternatively, the SMF transmits the PDR and the QER to the UPF when or in response to a determination that a forwarding rate of a DHCP request of the UPF reaches a limit threshold.

Step 140: Receive, by the UPF, the PDR and the QER transmitted by the SMF.

Step 160: Identify, by the UPF, a target packet transmitted by a terminal according to the PDR.

The PDR includes at least one of a first PDR and a second PDR.

The first PDR is a PDR for identifying the DNS query packet.

The second PDR is a PDR for identify the DHCP request packet.

Step 180: Limit, by the UPF, transmission of the target packet according to the QER.

The QER includes at least one of a first QER and a second QER.

The first QER is a QER limiting a maximum bit rate (MBR) of the target packet.

The second QER is a QER instructing the UPF to stop forwarding the target packet.

That is, the second QER is a QER instructing the UPF to stop transmitting the DNS query packet of the terminal to the EASDF, and/or the second QER is a QER instructing the UPF to stop transmitting the DHCP request packet of the terminal to the SMF.

In certain embodiment(s), the PDR and the QER are configured for a single UE granularity. Alternatively, the PDR is configured for a plurality of pieces of UE, and the QER is configured for a single piece of UE, or a PDU session within the single piece of UE, or a specific QoS flow within the single piece of UE. The specific QoS flow is a QoS flow dedicated to the target packet. Alternatively, the PDR and the QER are configured for the plurality pieces of UE.

In summary, according to the method provided in this embodiment, the UPF is enabled to identify the target packet based on the PDR and limit the transmission of the target packet based on the QER by providing the PDR and the QER to the UPF through the SMF, thereby defending a DoS attack or a DDoS attack initiated by abnormal UE and ensuring that the mobile communication system serves for more UE as much as possible.

Figure 6:
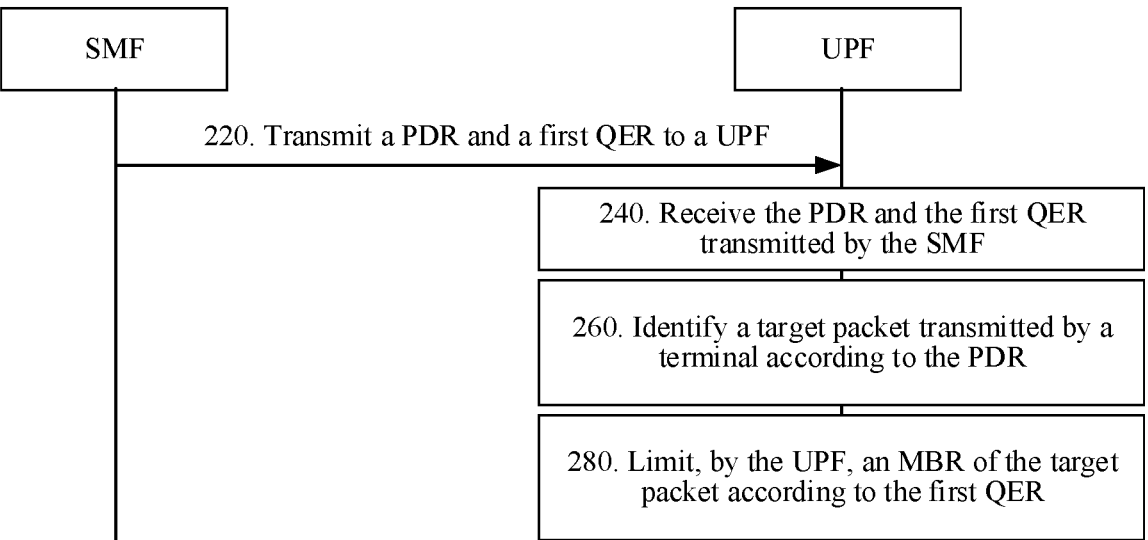
FIG. 6 is a schematic flowchart of a method for solving a DoS attack according to certain embodiment(s) of the present disclosure.

For the first QER,

FIG. 6 is a flowchart of a method for solving a DoS attack according to an exemplary embodiment of the present disclosure. This embodiment is described through an example in which the method is performed by the SMF, the UPF, and the UE. The method includes:

Step 220: Transmit, by the SMF, the PDR and the first QER to the UPF.

The PDR is used for identifying the target packet transmitted by the terminal, and the first QER is used for limiting the MBR of the target packet.

The target packet includes at least one of the DNS query packet and the DHCP request packet. Accordingly, the PDR includes at least one of the first PDR and the second PDR. The first PDR is used for identifying the DNS query packet. The second PDR is used for identifying the DHCP request packet.

Exemplarily, the first PDR includes at least one of the following:

A packet type is a user datagram protocol (UDP) packet and a destination port number of the UDP packet is 53.

The packet is a packet runs by a DNS protocol on a UDP, which is referred to as a packet of a DNS over 53 type.

The packet type is the UDP packet, a destination IP address of the UDP packet is an IP address of the EASDF, and the destination port number of the UDP packet is 53.

The packet is a DNS packet of the DNS over 53 type (the destination IP address is the EASDF).

A packet type is a user datagram protocol (TCP) packet and a destination port number of the TCP packet is 853.

The packet is a packet run by the DNS on a transport layer security (TLS) protocol, which is referred to as a packet of a DOT type.

The packet type is the TCP packet, a destination IP address of the TCP packet is the IP address of the EASDF, and the destination port number of the TCP packet is 853 or 443.

If the destination port number is 853, the packet is a DNS packet of the DOT type (the destination IP address is the EASDF). If the destination port number is 443, the packet is a DNS packet run by the DNS on a hypertext transfer protocol (HTTP) (the destination IP address is the EASDF).

Exemplarily, the second PDR includes at least one of the following:

A packet type is a UDP packet and a destination port number of the UDP packet is 68. Alternatively, the packet type is the UDP packet, and the destination port number of the UDP packet is 68 and a source port number is 67. The packet is the DHCP request packet.

The packet type is the UDP packet, and the destination port number of the UDP packet is 67 and the source port number is 68. The packet is the DHCP response packet.

In certain embodiment(s), the SMF transmits the PDR and the first QER to the UPF when or in response to a determination that a reporting rate of the EASDF reaches a limit threshold. Alternatively, the SMF transmits the PDR and the first QER to the UPF when or in response to a determination that a DHCP request forwarded by the UPF reaches a limit threshold.

In some embodiments, if the EASDF is only used for a DNS service, the DNS query packet may be more generally identified as a packet whose destination IP address is the EASDF and port number is 53/853/443. Alternatively, only all UDP and TCP packets whose destination IP addresses are the EASDF are identified as DNS query packets.

Step 240: Receive, by the UPF, the PDR and the first QER transmitted by the SMF.

Step 260: Identify, by the UPF, a target packet transmitted by a terminal according to the PDR.

When or in response to a determination that the first PDR is met, the DNS query packet is considered to be identified.

When or in response to a determination that the second PDR is met, the DHCP request packet is considered to be identified.

Step 280: Limit, by the UPF, an MBR of the target packet according to the first QER.

In certain embodiment(s), the UPF limits the MBR when the terminal transmits the target packet according to the first QER. Alternatively, the UPF limits the MBR when the UPF forwards the target packet according to the first QER.

In an embodiment, the target packet includes different types. The MBR includes at least two MBRs, the at least two MBRs being respectively applicable to different types of the target packets. For example, the target packet includes: the DNS query packet and the DHCP request packet.

The MBR includes: a first MBR for limiting the DNS query packet and a second MBR for limiting the DHCP request packet.

In an embodiment, the MBR includes at least one of the following: an aggregate maximum bit rate (AMBR) of UE; an AMBR of a protocol data unit (PDU) session; and an MBR of a quality of service (QoS) flow.

That is, the UPF may limit the MBR of the target packet according to UE granularity, PDU granularity, or QoS flow granularity.

In summary, according to the method provided in this embodiment, the UPF is enabled to identify the target packet according to the UPF and limit the MBR of the target packet according to the first QER by providing the PDR and the first QER to the UPF through the SMF, thereby defending a DoS attack or a DDoS attack initiated by abnormal UE and ensuring that the mobile communication system serves for more UE as much as possible.

Figure 7:
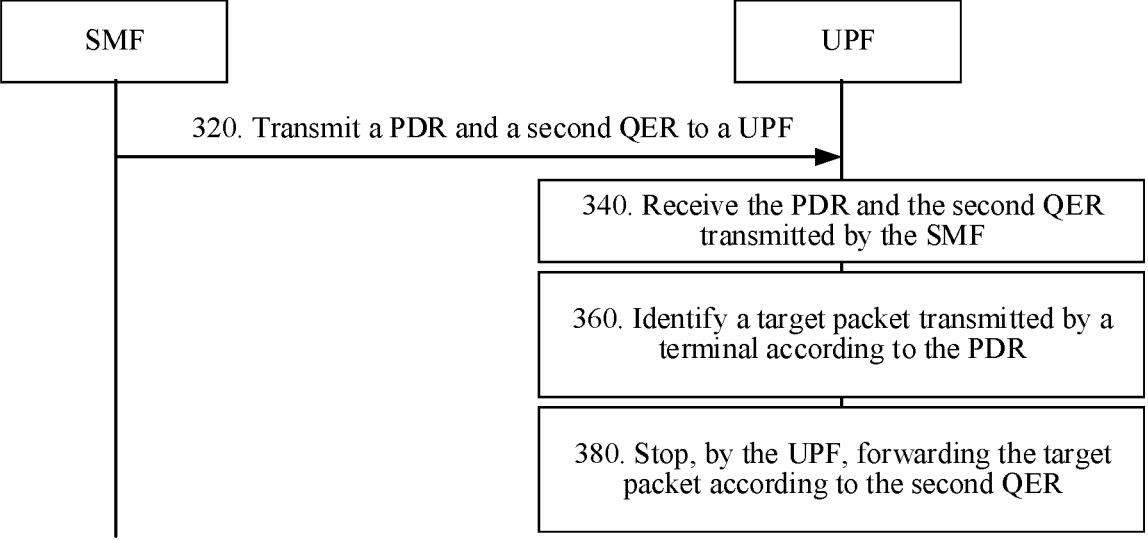
FIG. 7 is a schematic flowchart of a method for solving a DoS attack according to certain embodiment(s) of the present disclosure.

For the second QER,

FIG. 7 is a flowchart of a method for solving a DoS attack according to an exemplary embodiment of the present disclosure. This embodiment is described through an example in which the method is performed by the SMF, the UPF, and the UE. The method includes:

Step 320: Transmit, by the SMF, the PDR and the second QER to the UPF.

The PDR is used for identifying the target packet transmitted by the terminal, and the second QER is used for stopping forwarding the target packet.

The target packet includes at least one of the DNS query packet and the DHCP request packet. Accordingly, the PDR includes at least one of the first PDR and the second PDR. The first PDR is used for identifying the DNS query packet. The second PDR is used for identifying the DHCP request packet.

Exemplarily, the first PDR includes at least one of the following:

A packet type is a user datagram protocol (UDP) packet and a destination port number of the UDP packet is 53.

The packet type is the UDP packet, a destination IP address of the UDP packet is an IP address of the EASDF, and the destination port number of the UDP packet is 53.

A packet type is a user datagram protocol (TCP) packet and a destination port number of the TCP packet is 853.

The packet type is the TCP packet, a destination IP address of the TCP packet is the IP address of the EASDF, and the destination port number of the TCP packet is 853 or 443.

Exemplarily, the second PDR includes:

A packet type is a UDP packet and a destination port number of the UDP packet is 68. Alternatively, the packet type is the UDP packet, and the destination port number of the UDP packet is 68 and a source port number is 67.

In certain embodiment(s), the SMF transmits the PDR and the second QER to the UPF when or in response to a determination that a reporting rate of the EASDF reaches a limit threshold. Alternatively, the SMF transmits the PDR and the second QER to the UPF when or in response to a determination that a DHCP request forwarded by the UPF reaches a limit threshold.

In certain embodiment(s), the second QER further includes: backoff time (optional), the backoff time being a duration for which the UPF is instructed to stop forwarding the target packet.

Step 340: Receive, by the UPF, the PDR and the second QER transmitted by the SMF.

Step 360: Identify, by the UPF, a target packet transmitted by a terminal according to the PDR.

When or in response to a determination that the first PDR is met, the DNS query packet is considered to be identified.

When or in response to a determination that the second PDR is met, the DHCP request packet is considered to be identified.

Step 380: Stop, by the UPF, forwarding the target packet according to the second QER.

In certain embodiment(s), the UPF stops forwarding the DNS query packet to the EASDF according to the second QER, and/or stops forwarding the DHCP request packet to the SMF according to the second QER. That is, according to different configuration methods of the second QER, forwarding of the DNS query packet and the DHCP request packet may be stopped at the same time, or only forwarding of the DNS query packet is stopped, or only forwarding of the DHCP request packet is stopped.

When or in response to a determination that the second QER includes the backoff time, the UPF stops forwarding the target packet according to the second QER before the backoff time expires.

A message format of the PDR is provided in a communication protocol TS23.501 of a third generation partnership project (3GPP). The message format of the PDR is shown in the following Table 1:

TABLE 1

| Attribute | | Description | Remarks |
|---|---|---|---|
| N4 session ID | | Identifying an N4 session associated with this PDR. | Omitted |
| Rule number | | Identifying a unique identifier of this rule. | Omitted |
| Priority order | | Determining an order in which detection information of all rules is applied. | Omitted |
| Packet detection information. | Source interface | Including values "access side", "core side", "SMF", "N6-LAN", "5G VN internal". | UE IP address (combined with network instance if desired), CN channel information, packet filter set, application process ID, Ethernet PDU session information, QoS monitoring packet indicator, and QFI are used for traffic detection. Source interface identifies a position where PDR is applicable to an interface of an inputted packet for example, from an access side (i.e. uplink), from a core aspect (i.e. downlink), from SMF, from N6- LAN (i.e. DN or local DN, or from "5G VN internal" (i.e. local switch). |
| | UE IP address | An IPv4 address and/or an IPv6 prefix with a prefix length. | |
| | Network instance | Identifying a network instance associated with an inputted packet. | |
| | CN channel information | CN channel information on N3 and N9 interfaces, that is, F-TEID. | |
| | Packet filter set | Omitted | |
| | Application number | Omitted | |
| | QoS flow ID | Including a value of 5QI or non-standardized QFI. | |
| | Ethernet PDU session information | Referring to all (DL) Ethernet packets that match an Ethernet PDU session. | |
| | Frame route information | Frame routing. | |
| Packet replication and detection progress information | Packet replication skip information | Including UE address indication or N19/N6 indication. If a packet matches packet replication skip information, i.e. a source address of the packet is a UE address, or the packet has been received on an interface in the packet replication skip | Omitted |

TABLE 1-continued

| Attribute | Description | Remarks |
|---|---|---|
|  | information, a UP function neither creates a copy of the packet nor applies the packet. Corresponding processing (i.e. FAR, QER, URR). Otherwise, a UPF performs replication and applies the corresponding processing (i.e. FAR, QER, URR). |  |
| Instructing | Instructing a UPF function to continue a packet detection process, that is, to find another PDR without higher priority. |  |
| Removing external connector | Instructing a UP function to delete one or more external headers from an inputted packet | Any extension header is to be stored by this packet. |
| Forwarding operation rule ID | Forwarding action rule ID identifies a forwarding action that may be applied. | Omitted |
| Multiple access rule ID | Multiple access rule ID identifies an operation to be applied to process forwarding of an MA PDU session. | Omitted |
| Usage reporting rule ID list | Each usage reporting rule ID identifies a measurement action that may be performed. | Omitted |
| QoS enforcement rule ID list | Each QoS enforcement rule ID identifies a QoS enforcement operation that may be applied. | Omitted |

Correspondingly, a message format of QER is provided in a communication protocol TS23.501 of 3GPP. The following Table 2 shows the message format of the QER:

TABLE 2

| Attribute | Description | Remarks |
|---|---|---|
| N4 session ID | Identifying an N4 session associated with this QER. | Omitted |
| Rule number | Identifying a unique identifier of this rule. | Omitted |
| QoS implementation rule related ID | Allowing a UP function to associate identifiers of a plurality of sessions of the same UE and APN. | Used for associating a QoS implementation rule enforced by APN-AMBR. |
| Up/Down switch state | Indicating that a UP function lets a process pass or blocks flow. | Value includes: open, close, and close (terminate an operation "discard") after a report is measured. |
| Maximum bit rate | Maximum bit rate of uplink/downlink to be enforced on a packet. | Any one of the following: APN-AMBR Session-AMBR QoS flow MBR SDF MBR Carrying MBR. |
| Guaranteed bit rate | Uplink/downlink guaranteed bit rate authorized for a packet. | This field includes: QoS flow GBR Carrying GBR. |
| Average window | Calculating a duration of maximum and guaranteed bit rates. | This is used for calculating a packet received within the duration. |
| Down-link traffic marking | Flow-level packet marking in the downlink. | For UPF, this is used for controlling setting of RQI in a package header |
| QoS flow ID | The QoS flow ID is inserted through UPF. | UPF inserts a QFI value in a tunnel header of an outputted packet. |
| Classification policy indicator | Indicating a PPI value that may be inserted into an outputted packet by UP | PPI is only applicable to DL communication. UPF inserts the PPI into an external header of an outputted PDU. |

After identifying a DoS attack, the SMF sets an uplink switch state in the second QER to "off" and adds a backoff time (e.g. 5 minutes) in the second QER. The UPF stops transmitting the DNS query packet to an N6 interface or N9 interface because the uplink switch state is set to "off".

Figures 8, 9:
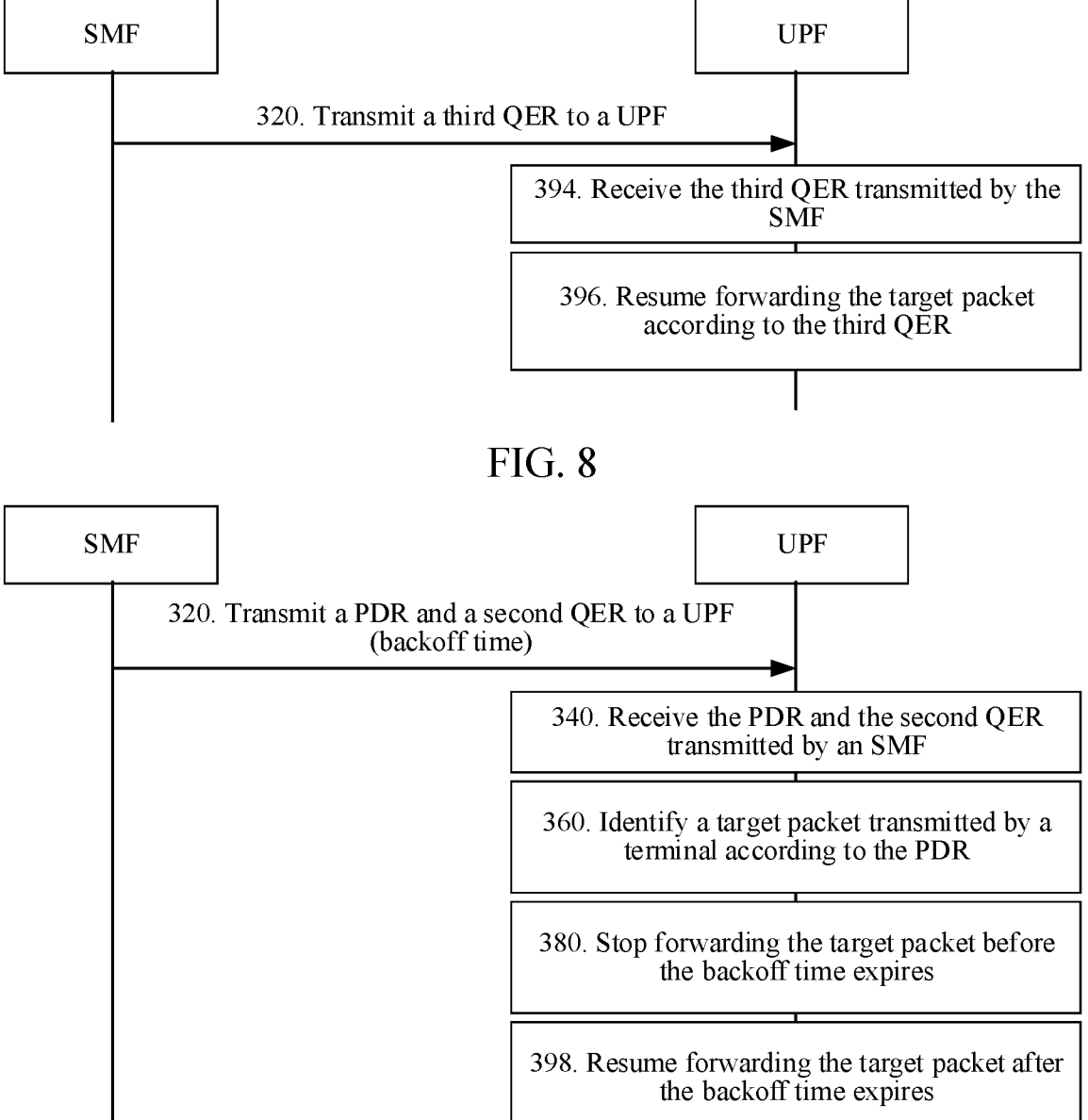
FIG. 8 is a schematic flowchart that a user plane function (UPF) resumes forwarding of a target packet according to certain embodiment(s) of the present disclosure.
FIG. 9 is a schematic flowchart that a UPF automatically resumes forwarding of a target packet according to certain embodiment(s) of the present disclosure.

After stopping forwarding the target packet, the UPF may further resume forwarding the target packet according to an instruction of the SMF. In certain embodiment(s), as shown in FIG. 8:

Step 392: Transmit, by the SMF, a third QER to the UPF, the third QER being a QER for instructing the UPF to resume forwarding the target packet.

When or in response to a determination that the second QER does not carry the backoff time or a timer corresponding to the backoff time does not expire, the SMF may transmit an N4 session modification request to the UPF again after a certain time, and Gate Status UL in the third QER included in the message is set as "on". In this way, a DNS interaction function between the UE and the EASDF is resumed.

Step 394: Receive, by the UPF, a third QER transmitted by the SMF.

Step 396: Resume, by the UPF, forwarding the target packet according to the third QER.

In certain embodiment(s), the UPF resumes forwarding the DNS query packet to the EASDF according to the third QER, and/or resumes forwarding the DHCP request packet to the SMF according to the third QER. That is, according to different configuration methods of the third QER, forwarding of the DNS query packet and the DHCP request packet may be resumed at the same time, or only forwarding of the DNS query packet is resumed, or only forwarding of the DHCP request packet is resumed.

After stopping forwarding the target packet, the UPF may further automatically resume forwarding the target packet. In certain embodiment(s), as shown in FIG. 9:

Step 398: Resume, by the UPF, forwarding the target packet after the backoff time expires.

When or in response to a determination that the UPF does not receive the third QER transmitted by the SMF, the UPF automatically resumes forwarding the target packet after the backoff time expires.

When or in response to a determination that the second QER carries the backoff time, the UPF automatically sets the uplink switch state to "on" after a timer corresponding to the backoff time expires, so that the UPF can continue to forward the DNS query packet to the N6 interface or the N9 interface, the UE can transmit the DNS query packet to the EASDF, and the EASDF can also transmit a report to the SMF.

In certain embodiment(s), the second QER carries a shared backoff time, which is a backoff time shared by at least two types of target packets of the EASDF. If the UPF does not receive the third QER transmitted by the SMF, the UPF automatically resumes forwarding the two types of target packets after the shared backoff time expires.

In certain embodiment(s), the second QER carries at least one of a first backoff time and a second backoff time. The first backoff time is a backoff time corresponding to the DNS query packet, and the second backoff time is a backoff time corresponding to the DHCP request packet.

If the UPF does not receive the third QER transmitted by the SMF, the UPF automatically resumes forwarding of the DNS query packet after the first backoff time expires. The UPF automatically resumes forwarding of the DHCP request packet after the second backoff time expires.

In summary, according to the method provided in this embodiment, the SMF transmits a second QER based stop indication or a third QER based start indication to the UPF, actively controls the UPF to stop forwarding or resume forwarding of the target packet based on the second QER, or actively controls the UPF to resume forwarding of target packet based on the third QER, so that the SMF can actively control the forwarding of target packet in a core network, thereby defending a DoS attack or a DDoS attack initiated by abnormal UE and ensuring that the mobile communication system serves for more UE as much as possible.

In addition, the SMF can actively resume a reporting mechanism of the EASDF by actively resuming the forwarding of the DNS query packet, which can ensure normal use of functions such as UL CL insertion, BP insertion, and the like.

It is to be understood that although the steps in the flowcharts of FIG. 5, FIG. 6, FIG. 7, FIG. 8, and FIG. 9 are sequentially displayed in accordance with instructions of arrows, these steps are not necessarily performed sequentially in the order indicated by the arrows. Unless clearly specified in the present disclosure, there is no strict sequence limitation on the execution of the steps, and the steps may be performed in another sequence. Moreover, at least some of the steps in FIG. 5, FIG. 6, FIG. 7, FIG. 8, and FIG. 9 may include a plurality of sub-steps or a plurality of stages. The sub-steps or stages are not necessarily performed at the same moment, but may be performed at different moments. The sub-steps or stages are not necessarily performed sequentially, but may be performed with at least one part of the other steps or sub-steps of other steps or stages in turn.

FIG. 10 is a block diagram of an apparatus for solving a DoS attack according to an exemplary embodiment of the present disclosure. The apparatus may be implemented as the SMF, or a part of the SMF, or applied to the SMF. The apparatus includes: a transmission module 1020, configured to transmit a packet detection rule (PDR) and a QoS enforcement rule (QER) to a user plane function (UPF), the PDR being used for identifying a target packet transmitted by a terminal, and the QER being used for limiting transmission of the target packet, where the target packet is a packet that triggers a target core network element to initiate the DoS attack to the SMF.

In an embodiment, the QER further includes: a first QER, the first QER being a QER for limiting a maximum bit rate (MBR) of the target packet.

In an embodiment, the target packet includes different types. The MBR includes at least two MBRs, the at least two MBRs being respectively applicable to different types of the target packets.

In an embodiment, the MBR includes at least one of the following: an aggregate maximum bit rate (AMBR) of a terminal; an AMBR of a PDU session; and an MBR of a QoS flow.

In an embodiment, the QER further includes: a second QER, the second QER being a QER for instructing the UPF to stop forwarding the target packet.

In an embodiment, the second QER further includes: backoff time, the backoff time being a duration for which the UPF is instructed to stop forwarding the target packet.

In an embodiment, the transmission module 1020 is further configured to transmit a third QER to the UPF, the third QER being a QER for instructing the UPF to resume forwarding the target packet.

In an embodiment, the target packet includes: a DNS query packet, and the PDR includes a first PDR, the first PDR being used for identifying the DNS query packet.

In an embodiment, the first PDR includes at least one of the following: A packet type is a UDP packet and a destination port number of the UDP packet is 53. The packet type is the UDP packet, a destination IP address of the UDP packet is an IP address of the EASDF, and the destination port number of the UDP packet is 53. The packet type is a TCP packet and a destination port number of the TCP packet is 853. The packet type is the TCP packet, a destination IP address of the TCP packet is the IP address of the EASDF, and the destination port number of the TCP packet is 853 or 443.

In an embodiment, the target packet includes a DHCP request packet; and the PDR includes a second PDR, the second PDR being used for identifying the DHCP request packet.

In an embodiment, the second PDR includes: A packet type is a UDP packet and a destination port number of the UDP packet is 68.

In an embodiment, the transmission module 1020 is further configured to transmit the PDR and the QER to the UPF, including: transmitting, by the SMF, the PDR and the QER to a protocol data unit session anchor (PSA) UPF, the PSA UPF being a UPF connected to a data network (DN); or, transmitting, by the SMF, the PDR and the QER to a first intermediate UPF when or in response to a determination that there are at least two intermediate UPFs connected in series, the first intermediate UPF being any one of the at least two intermediate UPFs.

In an embodiment, the PDR and the QER are carried in an N4 session establishment/modification request.

FIG. 11 is a block diagram of an apparatus for solving a DoS attack according to an exemplary embodiment of the present disclosure. The apparatus may be implemented as the UPF, or a part of the UPF, or applied to the UPF. The apparatus includes: a receiving module 1120, configured to receive a packet detection rule (PDR) and a QoS enforcement rule (QER) transmitted by a session management function (SMF); and a processing module 1140, configured to identify a target packet transmitted by a terminal according to the PDR, and to limit transmission of the target packet according to the QER, the target packet being a packet that triggers a target core network element to initiate the DoS attack to the SMF.

In an embodiment, the QER further includes: a first QER, the processing module 1140 being configured to limit a maximum bit rate (MBR) of the target packet according to the first QER.

In an embodiment, the target packet includes different types. The MBR includes at least two MBRs, the at least two MBRs being respectively applicable to different types of the target packets.

In an embodiment, the MBR includes at least one of the following: an aggregate maximum bit rate (AMBR) of a terminal; an AMBR of a PDU session; and an MBR of a QoS flow.

In an embodiment, the QER further includes: a second QER, the processing module 1140 being configured to stop forwarding the target packet according to the second QER.

In an embodiment, the second QER further includes: backoff time, the processing module 1140 being configured to stop forwarding the target packet before the backoff time expires.

In an embodiment, the receiving module 1020 is further configured to receive the third QER transmitted by the SMF, the UPF resuming forwarding the target packet according to the third QER.

In an embodiment, the target packet includes: a DNS query packet, and the PDR includes a first PDR, the first PDR being used for identifying the DNS query packet.

In an embodiment, the first PDR includes at least one of the following: A packet type is a UDP packet and a destination port number of the UDP packet is 53. The packet type is the UDP packet, a destination IP address of the UDP packet is an IP address of the EASDF, and the destination port number of the UDP packet is 53. The packet type is a TCP packet and a destination port number of the TCP packet is 853. The packet type is the TCP packet, a destination IP address of the TCP packet is the IP address of the EASDF, and the destination port of the TCP packet is 853 or 443.

In an embodiment, the target packet includes a DHCP request packet; and the PDR includes a second PDR, the second PDR being used for identifying the DHCP request packet.

In an embodiment, the second PDR includes: A packet type is a UDP packet and a destination port number of the UDP packet is 68.

In an embodiment, the UPF is a protocol data unit session anchor (PSA) UPF, the PSA UPF being a UPF connected to a data network (DN); or, the UPF is a first intermediate UPF, the first intermediate UPF being any one of at least two intermediate UPFs connected in series.

In an embodiment, the PDR and the QER are carried in an N4 session establishment/modification request.

The transmission module is configured to perform steps related to transmission in the method embodiments, the receiving module is configured to perform steps related to receiving in the method embodiments, and the processing module is configured to perform steps other than transmitting and receiving steps in the method embodiments, and details are not repeated in this embodiment.

FIG. 12 is a schematic structural diagram of a network element device according to an embodiment of the present disclosure. For example, the network element device may be configured to perform the method for solving a DoS attack. In certain embodiment(s), the network element device 1200 may include: a processor 1201, a receiver 1202, a transmitter 1203, a memory 1204, and a bus 1205.

The processor 1201 includes one or more processing cores. The processor 1201 runs a software program and a module to execute various functional applications and perform information processing.

The receiver 1202 and the transmitter 1203 may be implemented as a transceiver 1206 which may be a communication chip.

The memory 1204 is connected to the processor 1201 through the bus 1205.

The memory 1204 may be configured to store a computer program. The processor 1201 is configured to execute the computer program, to implement each step performed by the network element device, the access network entity, the core network element, or the core network entity in the method embodiments.

The transmitter 1203 is configured to perform steps related to transmission in the method embodiments. The receiver 1202 is configured to perform steps related to receiving in the method embodiments. The processor 1201 is configured to perform steps other than transmitting and receiving steps in the embodiments.

In addition, the memory 1204 may be implemented by using any type of volatile or non-volatile storage device or a combination thereof. The volatile or non-volatile storage device includes but is not limited to: a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device.

In an exemplary embodiment, a network element device is further provided, and the network element device includes: a processor and a memory, the memory storing a computer program, and the computer program being loaded and executed by the processor to implement the method for solving a DoS attack.

The present disclosure further provides a computer-readable storage medium, the storage medium storing at least one instruction, at least one program, a code set or an instruction set, and the at least one instruction, the at least one program, the code set or the instruction set being loaded and executed by a processor to implement the method for solving a DoS attack according to the method embodiments.

In certain embodiment(s), the present disclosure further provides a computer program product, the computer program product including computer instructions, the computer instructions being stored in a computer-readable storage medium. A processor of a computing device reads the computer instructions from the computer-readable storage medium and executes the computer instructions to cause the computing device to perform the method for solving a DoS attack provided in the aspect.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The sequence numbers of the embodiments of the present disclosure are merely for description purpose, and do not indicate any preference among the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The descriptions are merely optional embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for solving a denial-of-service (DOS) attack, performed by a session management function (SMF), and the method comprising:

upon identifying the DOS attack, transmitting, by the SMF, a packet detection rule (PDR) and a quality of service (QOS) enforcement rule (QER) to a user plane function (UPF), the PDR being used for identifying a target packet transmitted by a terminal, and the QER being used for limiting transmission of the target packet, wherein the target packet includes a domain name system (DNS) query packet or a dynamic host configuration protocol (DHCP) request packet, the DNS query packet or the DHCP request packet triggering a target core network element to initiate the DoS attack against the SMF, the DOS attack being associated with signaling triggered by the DNS query packet for an insertion operation of an uplink classifier of the SMF or signaling triggered by the DHCP request packet on an N4 interface between the UPF and the SMF, the PDR is used for identifying the DNS query packet or the DHCP request packet, and the QER is used for limiting transmission of the DNS query packet or the DHCP request packet.

2. The method according to claim 1, wherein the QER includes a first QER, the first QER being a QER for limiting a maximum bit rate (MBR) of the target packet.

3. The method according to claim 2, wherein the target packet includes different types, and the MBR includes at least two MBRs, the at least two MBRs being respectively applicable to different types of the target packets.

4. The method according to claim 2, wherein the MBR includes one or more of:

an aggregate maximum bit rate (AMBR) of the terminal;
an AMBR of a protocol data unit (PDU) session; and
an MBR of a QoS flow.

5. The method according to claim 1, wherein the QER includes a second QER, the second QER being a QER for instructing the UPF to stop forwarding the target packet.

6. The method according to claim 5, wherein the second QER further includes backoff time, the backoff time being a duration for which the UPF is instructed to stop forwarding the target packet.

7. The method according to claim 5, further comprising:

transmitting, by the SMF, a third QER to the UPF, the third QER being a QER for instructing the UPF to resume forwarding the target packet.

8. The method according to claim 1, wherein the target packet includes the DNS query packet, and the PDR comprises a first PDR, the first PDR being used for identifying the DNS query packet.

9. The method according to claim 8, wherein the first PDR includes one or more of:

a packet type being a user datagram protocol (UDP) packet and a destination port number of the UDP packet being 53, the packet type being the UDP packet, a destination Internet protocol (IP) address of the UDP packet being an IP address of an edge application server discovery function (EASDF), and the destination port number of the UDP packet being 53, the packet type being a transmission control protocol (TCP) packet, and a destination port number of the TCP packet being 853, and the packet type being the TCP packet, a destination IP address of the TCP packet being the IP address of the EASDF, and the destination port number of the TCP packet being 853 or 443.

10. The method according to claim 1, wherein the target packet includes the DHCP request packet, and the PDR includes a second PDR, the second PDR being used for identifying the DHCP request packet.

11. The method according to claim 10, wherein the second PDR includes a packet type being a UDP packet and a destination port number of the UDP packet being 68.

12. The method according to claim 1, wherein transmitting the PDR and the QER to the UPF comprises:

transmitting, by the SMF, the PDR and the QER to a protocol data unit session anchor (PSA) UPF, the PSA UPF being a UPF connected to a data network (DN); or, transmitting, by the SMF, the PDR and the QER to a first intermediate UPF in response to a determination that there are at least two intermediate UPFs connected in series, the first intermediate UPF being any one of the at least two intermediate UPFs.

13. The method according to claim 1, wherein the PDR and the QER are carried in an N4 session establishment request or an N4 session modification request.

14. An apparatus for solving a denial-of-service (DOS) attack, the apparatus comprising: a memory storing computer program instructions; and a processor coupled to the memory and configured to execute the computer program instructions and perform:

upon identifying the DOS attack, transmitting a packet detection rule (PDR) and a quality of service (QOS) enforcement rule (QER) to a user plane function (UPF), the PDR being used for identifying a target packet transmitted by a terminal, and the QER being used for limiting transmission of the target packet, wherein the target packet includes a domain name system (DNS) query packet or a dynamic host configuration protocol (DHCP) request packet, the DNS query packet or the DHCP request packet triggering a target core network element to initiate the DOS attack against a session management function (SMF), the DOS attack being associated with signaling triggered by the DNS query packet for an insertion operation of an uplink classifier of the SMF or signaling triggered by the DHCP request packet on an N4 interface between the UPF and the SMF, the PDR is used for identifying the DNS query packet or the DHCP request packet, and the QER is used for limiting transmission of the DNS query packet or the DHCP request packet.

15. The apparatus according to claim 14, wherein the QER includes a first QER, the first QER being a QER for limiting a maximum bit rate (MBR) of the target packet.

16. The apparatus according to claim 15, wherein the target packet includes different types, and the MBR includes at least two MBRs, the at least two MBRs being respectively applicable to different types of the target packets.

17. The apparatus according to claim 15, wherein the MBR includes one or more of:

an aggregate maximum bit rate (AMBR) of the terminal;

an AMBR of a protocol data unit (PDU) session; and an MBR of a QoS flow.

18. The apparatus according to claim 14, wherein the QER includes a second QER, the second QER being a QER for instructing the UPF to stop forwarding the target packet.

19. The apparatus according to claim 18, wherein the second QER further includes backoff time, the backoff time being a duration for which the UPF is instructed to stop forwarding the target packet.

20. A non-transitory computer-readable storage medium storing computer program instructions executable by at least one processor to perform:

upon identifying a denial-of-service (DOS) attack, solving the DOS attack by transmitting a packet detection rule (PDR) and a quality of service (QOS) enforcement rule (QER) to a user plane function (UPF), the PDR being used for identifying a target packet transmitted by a terminal, and the QER being used for limiting transmission of the target packet, wherein the target packet includes a domain name system (DNS) query packet or a dynamic host configuration protocol (DHCP) request packet, the DNS query packet or the DHCP request packet triggering a target core network element to initiate the DOS attack against a session management function (SMF), the DOS attack being associated with signaling triggered by the DNS query packet for an insertion operation of an uplink classifier of the SMF or signaling triggered by the DHCP request packet on an N4 interface between the UPF and the SMF, the PDR is used for identifying the DNS query packet or the DHCP request packet, and the QER is used for limiting transmission of the DNS query packet or the DHCP request packet.

* * * * *